United States Patent
Pau et al.

(10) Patent No.: US 9,158,991 B2
(45) Date of Patent: Oct. 13, 2015

(54) IMAGE-FEATURE DETECTION

(71) Applicant: STMicroelecronics S.r.l., Agrate Brianza (IT)

(72) Inventors: Danilo Pietro Pau, Sesto San Giovanni (IT); Arcangelo Ranieri Bruna, Giardini Naxos (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 93 days.

(21) Appl. No.: 13/773,847

(22) Filed: Feb. 22, 2013

(65) Prior Publication Data

US 2013/0216097 A1    Aug. 22, 2013

(30) Foreign Application Priority Data

Feb. 22, 2012   (IT) ................................. VI2012A0041

(51) Int. Cl.
*G06K 9/46*   (2006.01)

(52) U.S. Cl.
CPC ............ *G06K 9/4642* (2013.01); *G06K 9/4671* (2013.01); *G06T 2207/20021* (2013.01)

(58) Field of Classification Search
CPC ............... G06K 9/4642; G06K 9/4671; G06T 2207/20021
See application file for complete search history.

(56) References Cited

U.S. PATENT DOCUMENTS

| | | | | |
|---|---|---|---|---|
| 6,463,163 B1 * | 10/2002 | Kresch | ......................... | 382/103 |
| 6,990,246 B1 * | 1/2006 | Ferguson | ...................... | 382/240 |
| 8,027,514 B2 * | 9/2011 | Takaki et al. | ................. | 382/103 |
| 8,144,947 B2 * | 3/2012 | Kletter | ........................... | 382/124 |
| 8,391,615 B2 * | 3/2013 | Wu et al. | ........................ | 382/218 |
| 9,008,424 B2 * | 4/2015 | Cordara et al. | ............... | 382/170 |
| 2007/0098222 A1 * | 5/2007 | Porter et al. | .................. | 382/103 |
| 2009/0059265 A1 * | 3/2009 | Kitahara | ...................... | 358/1.13 |
| 2010/0169576 A1 | 7/2010 | Chen | | |
| 2011/0243378 A1 * | 10/2011 | Lee | ............................... | 382/103 |
| 2012/0243732 A1 * | 9/2012 | Swaminathan et al. | ...... | 382/103 |
| 2014/0153779 A1 * | 6/2014 | Feris et al. | .................... | 382/103 |

FOREIGN PATENT DOCUMENTS

EP     1 850 270 A1    10/2007

OTHER PUBLICATIONS

J-Q. Lu, Timothy S. Cale, Ronald J. Gutmann, "Wafer-Level Three-Dimensional Hyper-Integration Technology Using Dielectric Adhesive Wafer Bonding", Materials for Information Technology Engineering, Materials and Processes 2005, pp. 405-417.
David G. Lowe, "Distinctive Image Features from Scale-Invariant Keypoints", International Journal of Computer Vision, vol. 60, Issue 2, Nov. 2004, Kluwer Academic Publishers Hingham, MA, pp. 91-110.

(Continued)

*Primary Examiner* — Katrina Fujita
(74) *Attorney, Agent, or Firm* — Seed IP Law Group PLLC

(57) ABSTRACT

An embodiment is a method for detecting image features, the method including extracting a stripe from a digital image, the stripe including of a plurality of blocks; processing the plurality of blocks for localizing one or more keypoints; and detecting one or more image features based on the one or more localized keypoints.

18 Claims, 3 Drawing Sheets

(56) References Cited

OTHER PUBLICATIONS

Bay et al., "Surf: Speeded Up Robust Features," Computer Vision—EECV 2006 9th European Conference on Computer Vision, Graz, Austria, May 7-13, 2006, pp. 404-417.

Lienhart, *Video Mining*, Springer-Verlag US, Chapter 6, "Video OCR: A Survey and Practitioner's Guide," pp. 155-183, 2003.

Lowe, "Distinctive Image Features from Scale-Invariant Keypoints," *International Journal of Computer Vision* 60(2):91-110, 2004.

\* cited by examiner

IMAGE-FEATURE DETECTION

PRIORITY CLAIM

The instant application claims priority to Italian Patent Application No. VI2012A000041, filed Feb. 22, 2012, which application is incorporated herein by reference in its entirety.

TECHNICAL FIELD

An embodiment relates to the art of detection of image-interest points and features in an image and, in particular, image-feature detection based on keypoint localization and keypoint descriptors.

SUMMARY

The detection of image features is an important task in a variety of computer-vision applications. For example, feature detection is a step in image matching, object recognition, and content-based image recognition. Typical image features include edges, corner, ridges, and blobs.

State-of-the-art feature detection is usually referred to the Scale-Invariant Feature Transform (SIFT) algorithm; see, for example, "Distinctive Image Features from Scale-Invariant Keypoints", by David G. Lowe, in International Journal of Computer Vision, 60, 2 (2004), pages 91-110, which is incorporated by reference and is prior art. Lowe is based on a Difference of Gaussian filtered images and extrema detection on them using predecessor and successor DoG images. Lowe's feature descriptor may be particularly advantageous in that it is tolerant to some form of view point change, image scaling, illumination changes, perspective transforms, translations and rotations. The SIFT algorithm includes four stages of computation (for details see the referenced article by Lowe).

The first stage is scale-space extrema detection using a Difference of Gaussion (DoG) function. The scale space is defined by the function $L(x, y, \sigma) = G(x, y, \sigma) \otimes I(x, y)$ where $\otimes$ is the convolution operator, $G(x, y, \sigma)$ is a variable-scale Gaussian, and $I(x, y)$ is the input image under consideration.

The next stage is stable keypoint localization that is achieved based on computing the difference between two images, one with scale k times the other: $D(x, y, \sigma) = L(x, y, k\sigma) - L(x, y, \sigma)$, and detecting local maxima and minima of $D(x, y, \sigma)$.

The third stage is orientation assignment to each keypoint location based on local-image-gradient directions computed on neighbouring pixels. By assigning a consistent orientation to each keypoint based on local-image properties, a keypoint descriptor obtained in the fourth stage can be represented relative to this orientation. Keypoint descriptors typically make use of a set of 16 histograms from gradient orientations of sample points, aligned in a 4×4 grid, each with 8 orientation bins, one for each of the main compass directions (e.g., at intervals of 45 degrees) and one for each of the mid-points of these directions.

However, current implementations of the SIFT algorithm typically require high computational complexity, high-power processors, and typically demand relatively large memory due to scale and octave buffering. Furthermore, current limitations of the SIFT algorithm offer limited parallelism at increasing image resolutions (e.g. VGA, 5 Mpels, 8 Mpels etc). On the other hand, real-time feature detection in embedded systems, for example, mobile image-capturing devices such as digital photo cameras, is typically highly desirable for visual search applications. Thus, despite the recent engineering progress, there is still a need for an improved feature detection that allows for implementation in mobile image-capturing devices suffering from restricted computational resources. The same is true in other application domains like surveillance, automotive, and digital entertainment.

An embodiment addresses the above-mentioned need and, accordingly, is a method for detecting image features, the method including extracting a stripe from a digital image, the stripe including of a plurality of blocks;

processing the plurality of blocks for localizing one or more keypoints; and detecting one or more image features based on the one or more localized keypoints.

The image can be a digital photo, for example, acquired by an image sensor before any compression like MJPEG, MPEG2, VP8, H264, or the equivalent. The image can be also taken from a video stream. The stripe includes a subset of pixels of the digital image. The stripe can be a horizontally or vertically oriented and extracted from the digital image. The stripe may consist of a number of only horizontally arranged blocks or a number of only vertically arranged blocks. Each block includes a subset of pixels of the stripe. Typical block sizes, as non limiting examples, are in the range of 16×16, 32×32, and 64×64 to 128×128 pixels, for example, but the blocks also can be rectangular instead of square like 32×64 for example.

According to an embodiment, the processing for feature detection is performed in a block-based manner for a stripe extracted from the entire image under consideration. Thereby, the memory requirement, processing latency, and processing time can be greatly reduced, and computational parallelism increased, as compared to at least some of the prior art.

According to an embodiment, the step of processing the plurality of blocks includes transforming the block data of the blocks into the frequency domain. This step corresponds to the transformation to a grey-scale (or any other color space) picture acquired by an image-processing pipeline that reads the raw Bayer pattern and converts the pattern into RGB or luminance and chrominance color space per pixel; however the transformed block data can also be the output of a video-decoder post processor able to perform noise reduction and image-quality improvements. The frequency distribution of the transformed block (data) gives a hint, due to the distribution of the spatial frequencies inside it, whether or not the block includes one or more keypoints; for example, if only a continual component would be available, it means a flat color distribution is available, no distinctive information are embedded and so no keypoints will be available, while an increasing richness of the horizontal, vertical and diagonal mix of frequency-components distribution will indicate the potential presence of keypoints depending on the distribution of the horizontal, vertical and diagonal components. Before determining whether the block is a possible candidate for a keypoint that includes, or forms part of, the block, the block data of the blocks transformed into the frequency domain may be subjected to band-pass filtering to select a restrict set of spatial frequencies in such a restricted frequency band for further processing, for example.

According to an embodiment, the processing of the plurality of blocks further includes filtering and down-sampling the block data of the blocks transformed into the frequency domain a number of times in order to generate a number of downscaled images (lower- or higher-resolution images). Each of them (including the first one obtained without any spatial down-sampling of the blocks of the extracted stripe)

includes a number of transformed blocks in the frequency domain. Each of them is processed for keypoint localization.

Before the actual keypoint localization in a block that is determined to be a candidate for including a keypoint, an embodiment of the method for feature detection may include inverse (back) frequency transforming the block data of the blocks from the frequency domain back into the spatial domain and, subsequently, the one or more keypoints are localized in the spatial domain based on the inversely transformed block data.

Alternatively, the one or more keypoints can be localized in the frequency domain based on the frequency-domain-filtered block data before inverse transforming the block data of the blocks. In both cases, keypoint localization is based on frequency-domain processing instead of pixel-domain processing such as Difference of Gaussians as known in the art. In order to achieve that a combination of horizontal, vertical and diagonal frequency (e.g., weighted sum) can be used to generate a score of any potential interest point in the block But as already mentioned, an embodiment of the method may include determining whether a block potentially includes a keypoint based on the frequency distribution of the band-pass filtered block data and wherein only a block determined to potentially include a keypoint is processed for keypoint localization to avoid an unnecessary subsequent computational load.

Depending on the computational resources, it is further envisaged that down-sampling of a block of the stripe to generate the lower resolution is performed in parallel to processing of the block for keypoint localization in the first (or higher) octave to save overall computation time by exploiting algorithm-intrinsic parallelism. For the same reason, processing for feature detection may be performed in parallel for a number of band-pass filters provided for an octave.

After localization of a keypoint, the above-described embodiments of the method for feature detection provided herein may further include extracting a patch of N×M sample points around the localized keypoint and processing the patch for feature detection. The processing of the patch for feature detection may, particularly, include generating a histogram of gradients of the sample points, assigning an orientation to each localized keypoint based on the histogram, and generating a keypoint descriptor for each localized keypoint based on the assigned orientation.

Alternatively the processing of the patch around the point of interest for feature detection may, particularly, include generating a vector of frequency components in a block of data around the detected point of interest without requiring further inverse transformation. Such a vector can be further thresholded, quantized, and entropy coded. For example, Zero Thresholding can be applied to the vector. The norm of the vector could be processed to become 1 (unity) so that every component of the vector pre-normalization is divided by the module of the same. By doing so, each element of the descriptor is between 0 and 1. Each value less than a threshold is set to 0. According to quantization, each value is mapped to an integer value represented by 6 or 4 bits, for example.

According to Adaptive Arithmetic Coding (AAC), the quantized vector of integer values is compacted with an adaptive arithmetic coding algorithm. Alternatively to AAC, Huffman coding may be used, or any combination of the two. Furthermore, Type Coding may be used, as may be any alternative of AAC, Huffman coding, and type coding.

The above-described processing can be repeated for any number of other stripes that constitute the image.

An embodiment, furthermore, is a computer-program product, including one or more computer-readable media having computer-executable instructions for performing the steps of a method, for example, according to one of the preceding embodiments.

Another embodiment is an image-capturing means or image-processing means including a chipset wherein steps of a method according to one of the above-described examples are implemented.

BRIEF DESCRIPTION OF THE DRAWINGS

Features and advantages of one or more embodiments will be described with reference to the drawings. In the description, reference is made to the accompanying figures, which are meant to illustrate one or more embodiments. It is understood that such one or more embodiments may not represent the full scope of the concepts disclosed herein.

DETAILED DESCRIPTION

Figure 1:
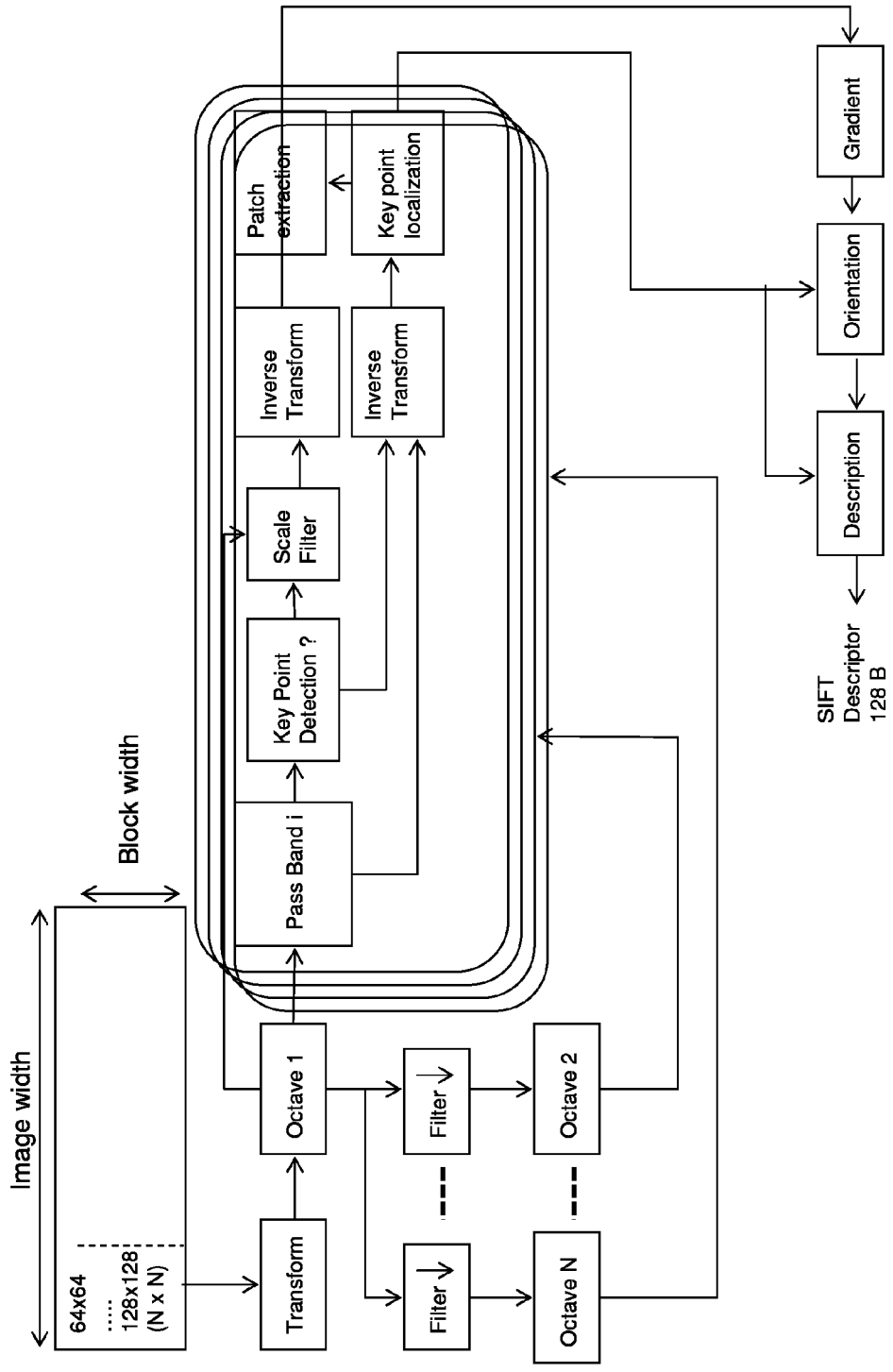
FIGS. 1 and 2 illustrate an example of an embodiment of a method for detecting image features including block-based keypoint localization in the transform domain.

An embodiment of a method for feature detection in an image is illustrated in FIG. 1. According to the shown example, an image is received from an image sensor of an image-capturing device. The image, for example, can be a digital still photo or a frame of a digital video. A horizontal stripe is extracted from the image. The stripe has significantly fewer pixels as compared to the entire image. The stripe can be stored in a local buffer or memory. The stripe includes pixel blocks of equal or varying sizes. A block is read from the buffer and a transform is applied to the block to provide the block data in the frequency domain, for example, a Discrete Cosine Transform (DCT), a Fast Fourier Transform (FFT), or any other mathematical transform. The transformed block is then stored in a buffer/memory (as part of a first resolution available from the imager).

As a next step, a block-based filter operates on the transformed block. The block-based filter may be implemented in the form of a matrix multiplication, and may result in discarding the highest and/or lower spatial frequencies. After this block-based filtering, it is determined whether the block potentially includes one or more keypoints. This determination can be performed based on the frequency distribution inside the block-based-filtered transformed block. If it is determined that it is a possible candidate for including a keypoint, it is subjected to a scale filtering, for example, implemented in the form of a matrix multiplication, and, subsequently, an inverse transform to obtain data in the spatial domain.

Scale filtering in the frequency domain is implemented similarly by a band-pass filtering in terms of matrix multiplication but using different coefficients for the filtering stage. Thus, in this implementation, no generation of the difference between any of the images is required.

The thus back-transformed block is then analyzed for detailed keypoint localization, making use of the trace of the determinant of the Hessian matrix. Employment of the Hessian matrix is well-known in the art (see, for example, "Distinctive Image Features from Scale-Invariant Keypoints", by David G. Lowe, in International Journal of Computer Vision, 60, 2 (2004), pages 91-110, which is incorporated by state of art reference). One or more keypoints are definitely localized, and a patch of N×M pixels (sample points) is extracted around each localized keypoint, respectively, for the subsequently performed conventional description processing, i.e., forming an orientation histogram from gradient orientations of sample points around the detected keypoint(s), assigning orientations, and generating keypoint descriptors by sampling magnitudes and orientations of the gradients in the neighborhoods of the localized keypoints.

However, the block may not be inverse transformed, so that a vector of frequency components is built by performing thresholding, quantization, and entropy encoding, and thus not requiring any further inverse transform.

The above-described processing can be performed in parallel for a plurality of band-pass filters of the same octave. Moreover, other octaves 2 to N are computed by down-sampling of the transformed block of the first octave. The down-sampling filter might be implemented by matrix multiplication in the frequency domain. The computation of the other octaves 2 to N can be performed in parallel to the above-described processing of the transformed block(s) of the first octave. Or, both for image smoothing and down-sampling, N-tap finite-impulse-response (FIR) filters having equivalent responses in the frequency domain might be employed.

Figure 2:
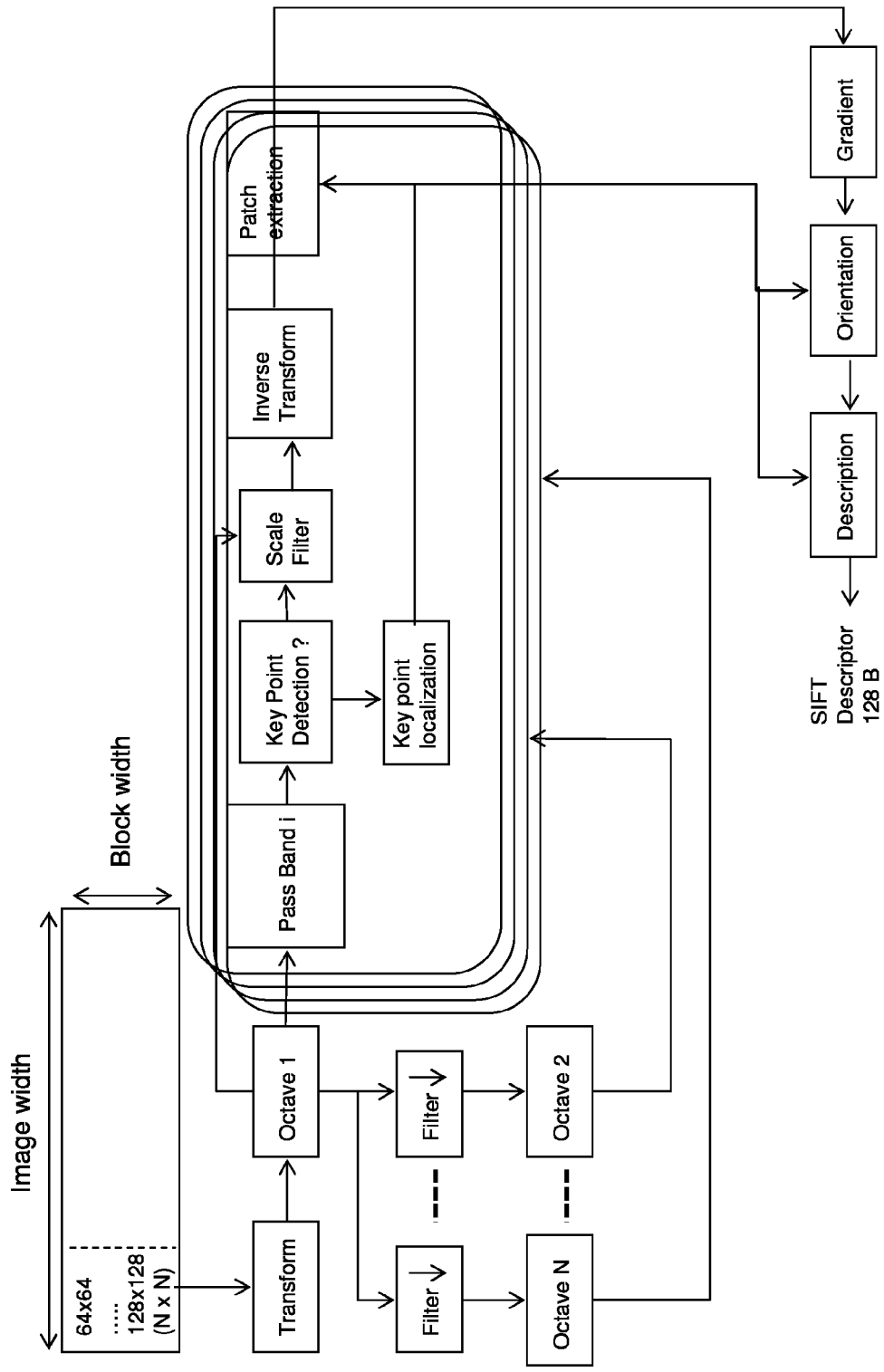

Another embodiment is illustrated in FIG. 2. Similar to the example described with reference to FIG. 1, a horizontal stripe is extracted from a received image, and a block of the image is transformed to the frequency domain. Band-pass filtering is performed for the transformed block of the first octave. However, different from the embodiment shown in FIG. 1, in this example, the keypoint localization is carried out in the frequency domain before back-transformation to the spatial domain by an inverse transform. In this example as well as in FIG. 1, a buffer stores just one stripe.

Figure 3:
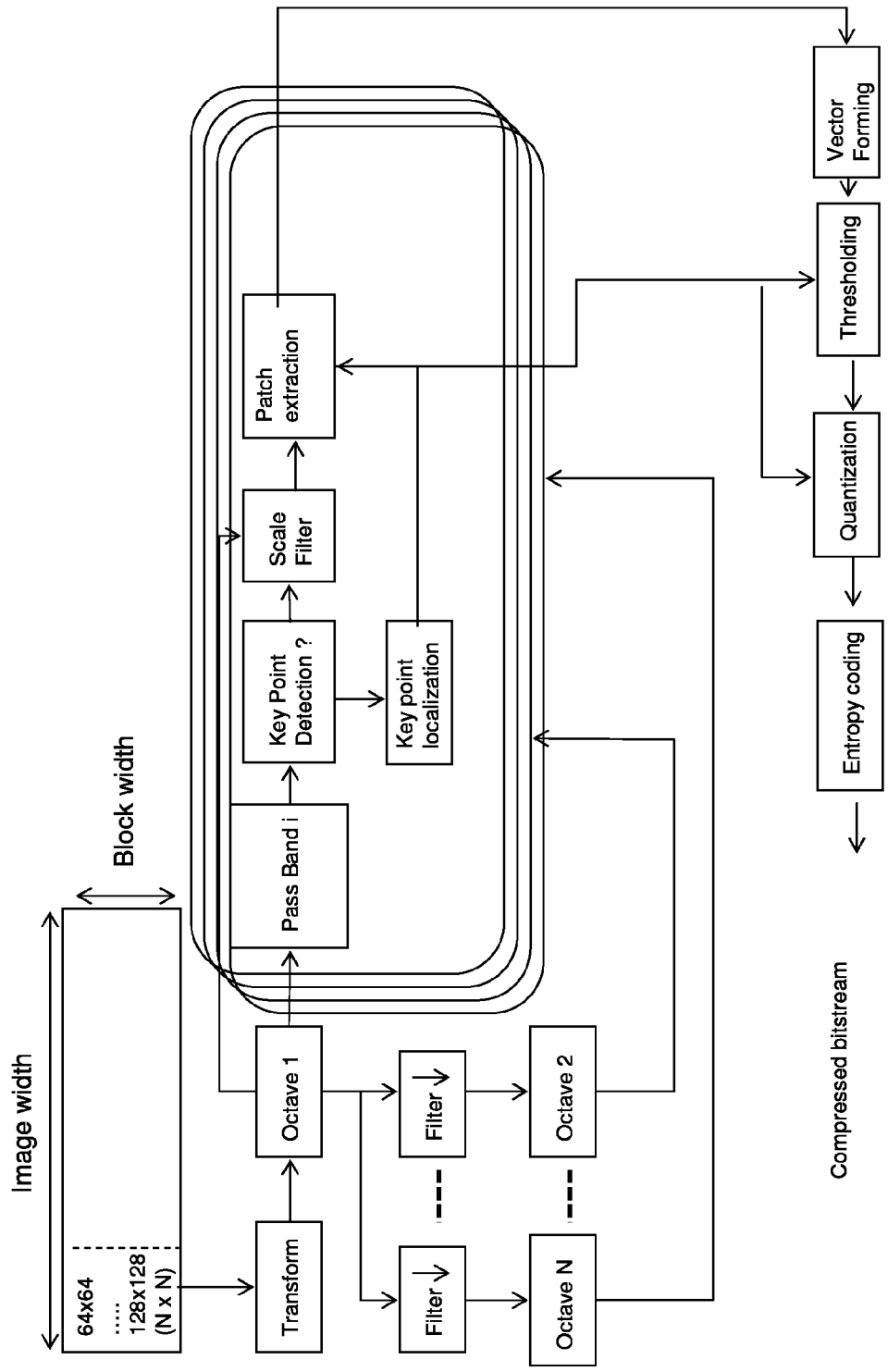
FIG. 3 illustrates an example of an embodiment of a method for detecting image features including block-based keypoint localization in the spatial or frequency domain with fewer resources.

In a third embodiment illustrated in FIG. 3, the entire processing is performed in a single domain, i.e., either in the spatial domain, if the transform is not performed, or in the transformed domain (i.e., Fourier or DCT domains). An advantage, in this case, is that the inverse transform is not needed, which may result in a significant savings in resources and in time. As mentioned above, thresholding, quantization, and entropy encoding are performed for feature detection.

All previously discussed embodiments are not intended as limitations, but serve as examples illustrating features and advantages of the related concepts. It is understood that some or all of the above-described features can also be combined in different ways.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
    analyzer circuitry configured to,
        extract a stripe from a digital image, the stripe including a plurality of image blocks,
        transform each of the image blocks in the stripe from a pixel domain into the frequency domain,
        filter each of the transformed image blocks, and
        analyze each filtered transformed image block to determine if each transformed image block likely includes one or more keypoints;
        scale filter those filtered transformed image blocks that are determined to likely include one or more keypoints,
        transform the scale filtered transformed image blocks back into the pixel domain;
        analyze the transformed scale filtered transformed image blocks to localize one or more keypoints, and
    detection circuitry configured to identify one or more image features based on the one or more localized keypoints.

2. The apparatus of claim 1 wherein the stripe represents a horizontal section of the digital image.

3. The apparatus of claim 1 wherein the stripe represents a vertical section of the digital image.

4. The apparatus of claim 1, wherein scale filtering those filtered transformed image blocks that are determined to likely include one or more keypoints comprises bandpass filtering the filtered transformed image blocks that are determined to likely include one or more keypoints.

5. The apparatus of claim 1 wherein the detection circuitry is configured to identify the image feature in response to a section of the image block, the section related to the image-feature.

6. The apparatus of claim 1 wherein the detection circuitry is configured to identify the image feature by:
    determining a respective gradient of each of components of the image block, the components corresponding to a location of the keypoint within the portion of the image;
    determining a respective orientation for each of the gradients; and
    identifying the image feature in response to the gradients and orientations.

7. The apparatus of claim 1 wherein the detection circuitry is configured to identify the image feature by:
    determining a respective gradient of each of components of the section of the image block;
    determining a respective orientation for each of the gradients; and
    identifying the image feature in response to the gradients and orientations.

8. A system, comprising:
    an image-capture device configured to capture an image; and
    an apparatus, including,
        analyzer circuitry configured to extract a stripe from the captured digital image, the stripe including a plurality of image blocks and the analyzer circuitry further configured to filter each of the transformed image blocks, analyze each filtered transformed image block to determine if each transformed image block likely includes one or more keypoints, scale filter those filtered transformed image blocks that are determined to likely include one or more keypoints, transform the scale filtered transformed image blocks back into the pixel domain, and analyze the transformed scale filtered transformed image blocks to localize one or more keypoints; and
        detection circuitry configured to identify an image feature using the one or more keypoints and determine locations of these keypoints.

9. The system of claim 8 wherein the image-capture device and the apparatus are disposed on a same integrated circuit.

10. The system of claim 8 wherein the image-capture device and the apparatus are disposed on respective integrated circuits.

11. The system of claim 8, further comprising a control circuit configured to control respective operations of the image-capture device and the apparatus.

12. A method of detecting features in a captured digital image, comprising:

identifying a stripe including a subset of the total number of pixels of the captured digital image;

locating a point or points of interest within an image block of the stripe, the stripe including a plurality of image blocks, and the locating including transforming the image blocks to the frequency domain;

filtering the blocks transformed to the frequency domain; and describing an image feature or features of the captured digital image using the located point or points of interest within the image blocks; and determining whether each image block potentially includes a point of interest based on a frequency distribution of the filtered block; and wherein only image blocks determined to potentially include a point or points of interest are subjected to locating a point or points of interest within those image blocks.

13. The method of claim 12, further comprising describing the image feature or features in response to a spatial frequency within the image blocks.

14. The method of claim 12 wherein the identifying includes:

setting at least some components of the image block having a relationship to a threshold equal to a same value, the components of the image block corresponding to a location of the point of interest within the portion of the image;

quantizing the components of the image block after the setting; and entropy coding the quantized components of the vector, the coded quantized components identifying the image feature.

15. The method of claim 12 wherein the describing includes:

determining a respective gradient of each of components of the image block, the components corresponding to a location of the point of interest within the portion of the image;

determining a respective orientation for each of the gradients; and describing the image feature in response to the gradients and orientations.

16. A non-transitory computer-readable storage medium storing instructions that, when executed by a computing apparatus, cause the computing apparatus, or another apparatus under control of the computing apparatus:

to identify a stripe including a subset of the total number of pixels of the captured digital image;

to locate a point or points of interest within an image block of the stripe, the stripe including a plurality of image blocks, and the locating including transforming the image blocks to the frequency domain;

to filter the blocks transformed to the frequency domain;

to identify an image feature or features of the captured digital image using the located point or points of interest within the image blocks;

to determine whether each image block potentially includes a point of interest based on a frequency distribution of the filtered block; and to locate a point or points of interest only within those image blocks determined to potentially include a point or points of interest.

17. The non-transitory computer-readable storage medium of claim 16, wherein the stripe is a horizontal stripe of the captured digital image.

18. The non-transitory computer-readable storage medium of claim 16, wherein each of the image blocks includes a fixed number of pixels of the captured digital image or the image blocks include varying numbers of pixels of the captured digital image.

* * * * *

UNITED STATES PATENT AND TRADEMARK OFFICE
CERTIFICATE OF CORRECTION

| | | |
|---|---|---|
| PATENT NO. | : 9,158,991 B2 | Page 1 of 1 |
| APPLICATION NO. | : 13/773847 | |
| DATED | : October 13, 2015 | |
| INVENTOR(S) | : Danilo Pietro Pau et al. | |

It is certified that error appears in the above-identified patent and that said Letters Patent is hereby corrected as shown below:

On the title page
Item (71):
"STMicroelecronics S.r.l., Agrate Brianza (IT)" should read,
--STMicroelectronics S.r.l., Agrate Brianza (IT)--.

Signed and Sealed this
Fifth Day of April, 2016

Michelle K. Lee
*Director of the United States Patent and Trademark Office*